US008546995B2

(12) United States Patent
Hung et al.

(10) Patent No.: US 8,546,995 B2
(45) Date of Patent: Oct. 1, 2013

(54) TWO-DIMENSIONAL MICROMECHANICAL ACTUATOR WITH MULTIPLE-PLANE COMB ELECTRODES

(75) Inventors: Chang-Li Hung, Taipei (TW); Ta-Wei Lin, Taipei (TW)

(73) Assignee: Opus Microsystems Corporation, Taipei (TW)

( * ) Notice: Subject to any disclaimer, the term of this patent is extended or adjusted under 35 U.S.C. 154(b) by 201 days.

(21) Appl. No.: 12/614,025

(22) Filed: Nov. 6, 2009

(65) Prior Publication Data

US 2011/0109194 A1 May 12, 2011

(51) Int. Cl.
*H02N 1/00* (2006.01)

(52) U.S. Cl.
CPC .................................. *H02N 1/008* (2013.01)
USPC ............ 310/309; 310/10; 310/12.03; 310/36; 310/300

(58) Field of Classification Search
CPC ....................................................... H02N 1/008
USPC ........................... 310/10, 12.03, 300, 309, 36
IPC ........................................................ H02N 1/00
See application file for complete search history.

(56) References Cited

U.S. PATENT DOCUMENTS

| | | | |
|---|---|---|---|
| 6,819,822 B2 | 11/2004 | Behin et al. | |
| 7,205,174 B2 | 4/2007 | Hung | |
| 7,271,946 B2 | 9/2007 | Esashi et al. | |
| 7,329,930 B2 | 2/2008 | Hung | |
| 2001/0048784 A1* | 12/2001 | Behin et al. | 385/18 |
| 2005/0194650 A1* | 9/2005 | Hung | 257/414 |
| 2006/0071578 A1* | 4/2006 | Drabe et al. | 310/309 |
| 2006/0082250 A1* | 4/2006 | Ko et al. | 310/309 |
| 2006/0268383 A1* | 11/2006 | Cho et al. | 359/223 |
| 2007/0063614 A1* | 3/2007 | Tsuboi et al. | 310/309 |
| 2011/0109194 A1* | 5/2011 | Hung et al. | 310/300 |

* cited by examiner

*Primary Examiner* — John K Kim
(74) *Attorney, Agent, or Firm* — Muncy, Geissler, Olds & Lowe, PLLC

(57) ABSTRACT

A micro-electro-mechanical actuator consists of a first semiconductor layer comprising a movable element with comb electrodes, a support element with inner and outer comb electrodes and a stationary element with comb electrodes, an electrical insulation layer, and a second semiconductor layer with a cavity to allow out-of-plane rotation of the movable and support elements. The movable element is mounted to the support element by a first pair of torsional hinges whereas the support element is mounted to the stationary element by a second pair of torsional hinges such that the actuator is in gimbaled structure. Inner comb electrodes of the support element interdigitate with comb electrodes of the movable element, and outer comb electrodes of the support element interdigitate with comb electrodes of the stationary element in the same plane defined by the first semiconductor layer to form in-plane comb-drive actuators. The in-plane comb-drive actuator may be controlled to generate two-dimensional oscillation of the movable element about the two axes defined by the torsional hinges. The second semiconductor layer may further comprise comb electrodes which interdigitate vertically with outer comb electrodes of support element to form vertical comb-drive actuators. Combing the in-plane and the vertical comb-drive actuators, the movable element is controllable to perform two-dimensional raster scan motion.

12 Claims, 18 Drawing Sheets

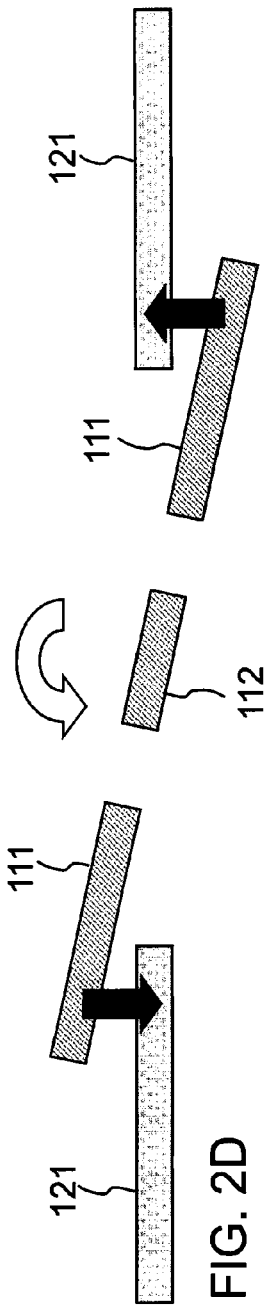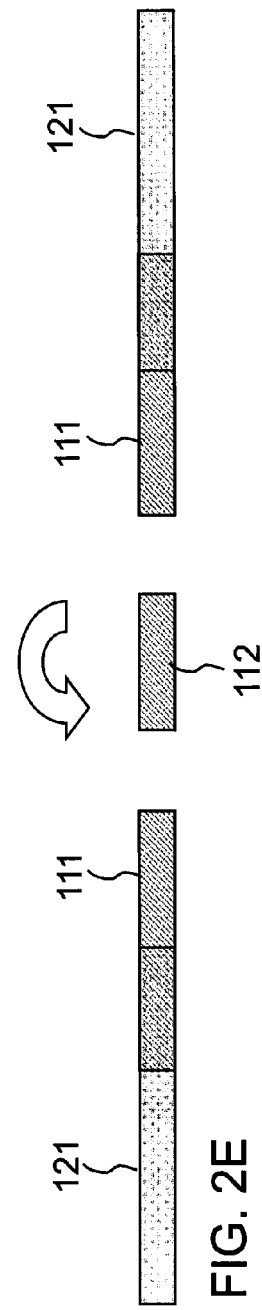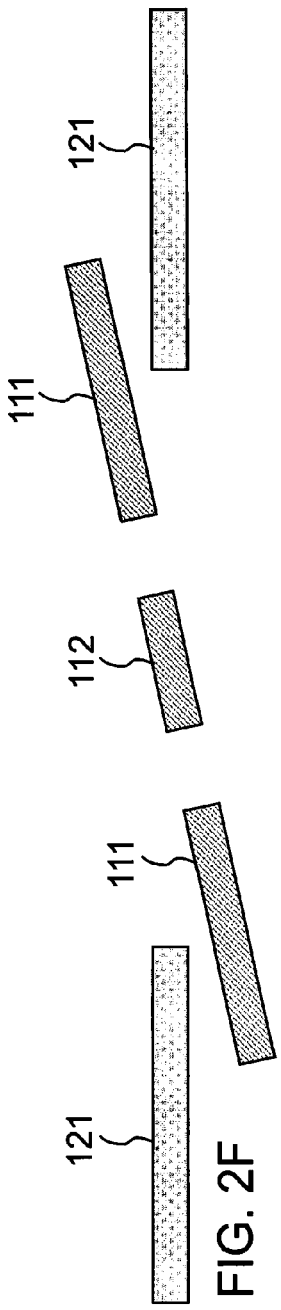

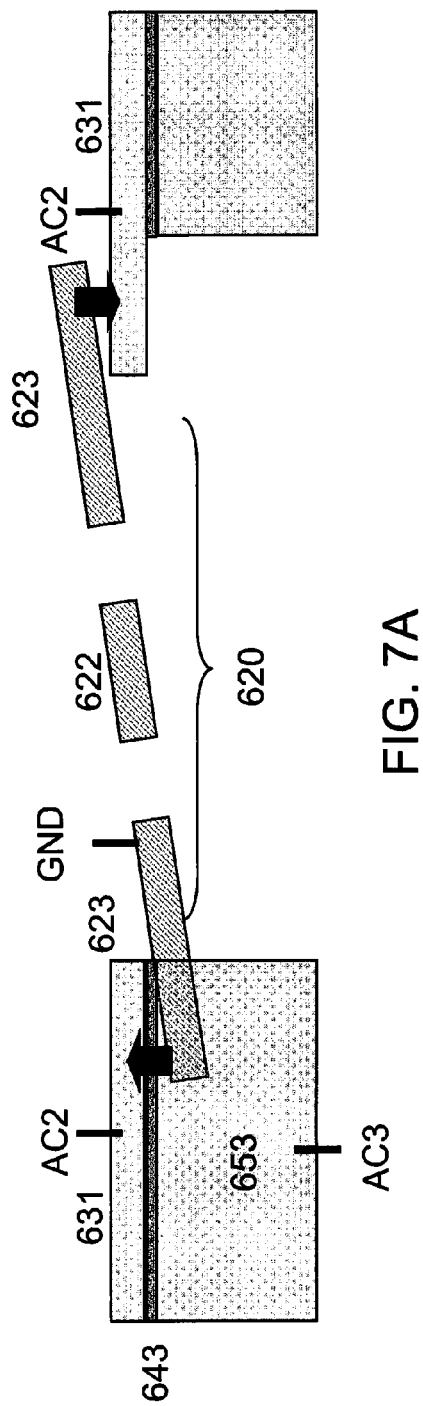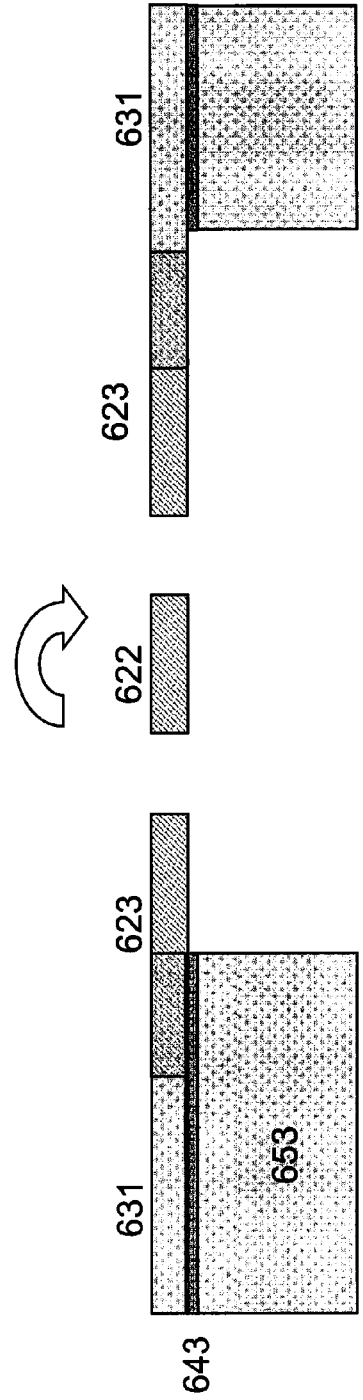

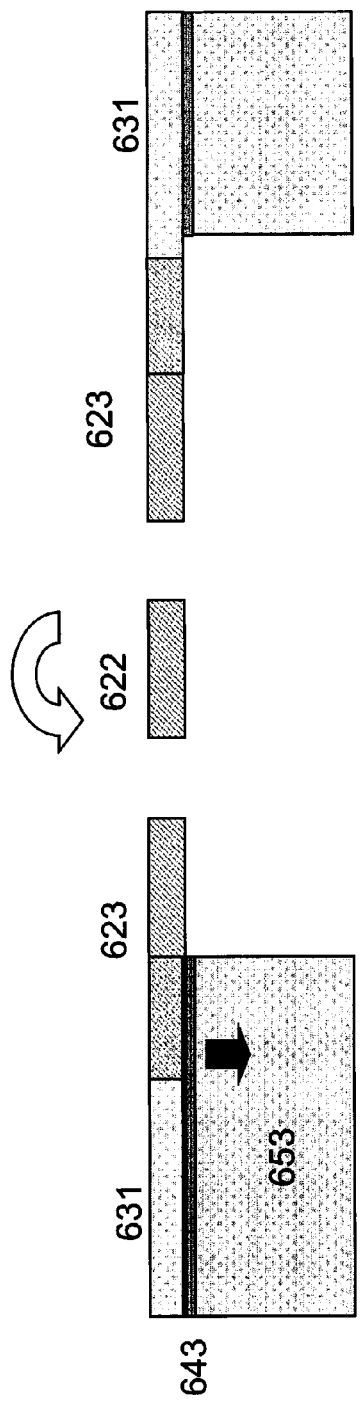
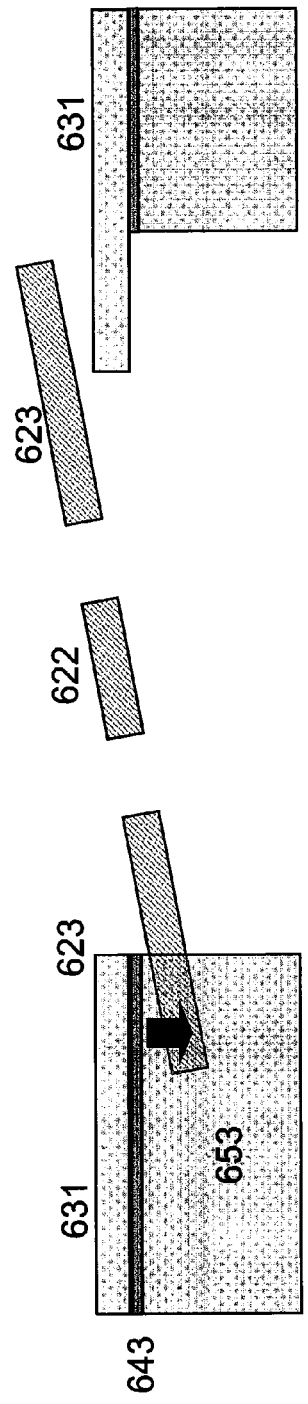
FIG. 7E
FIG. 7F

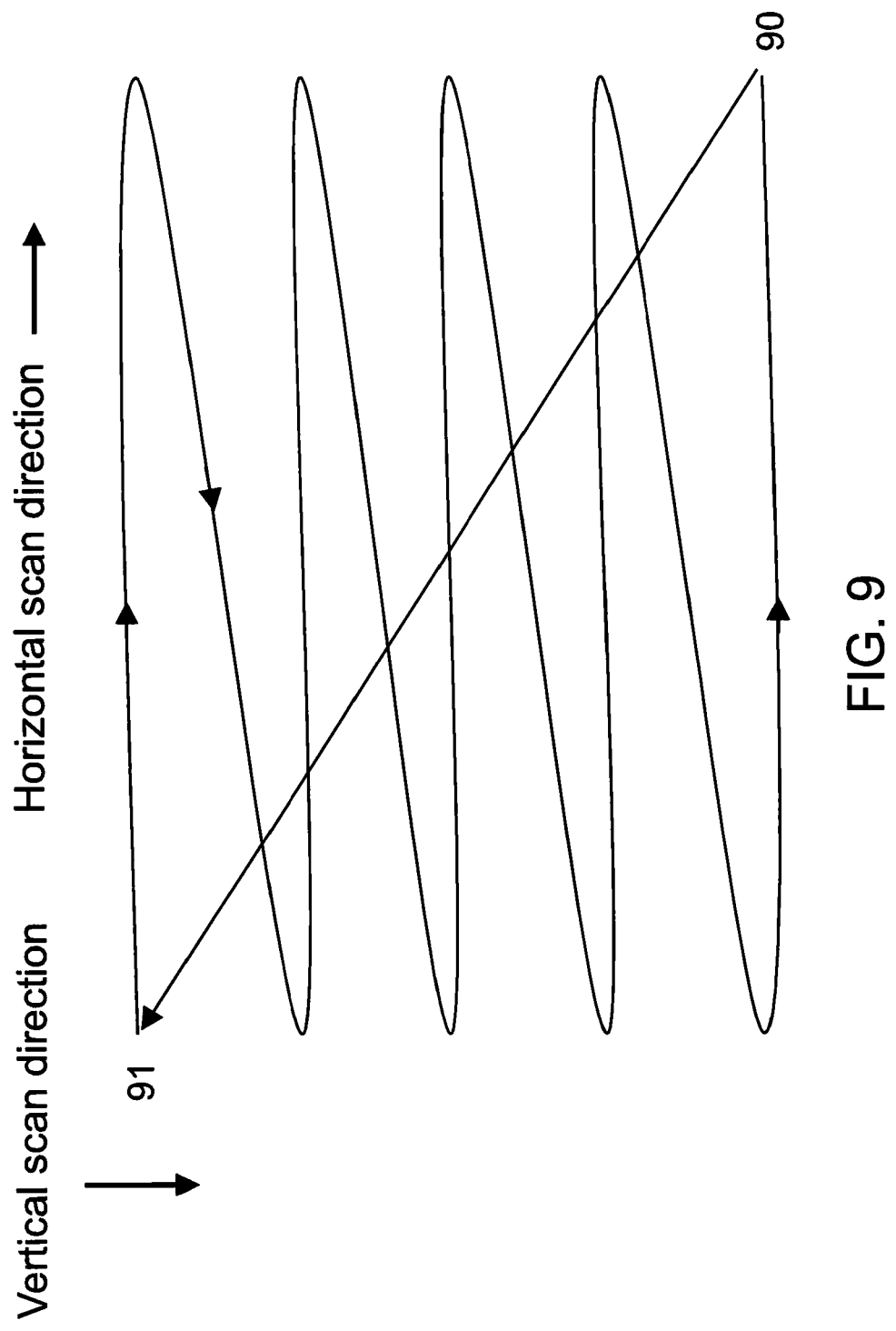

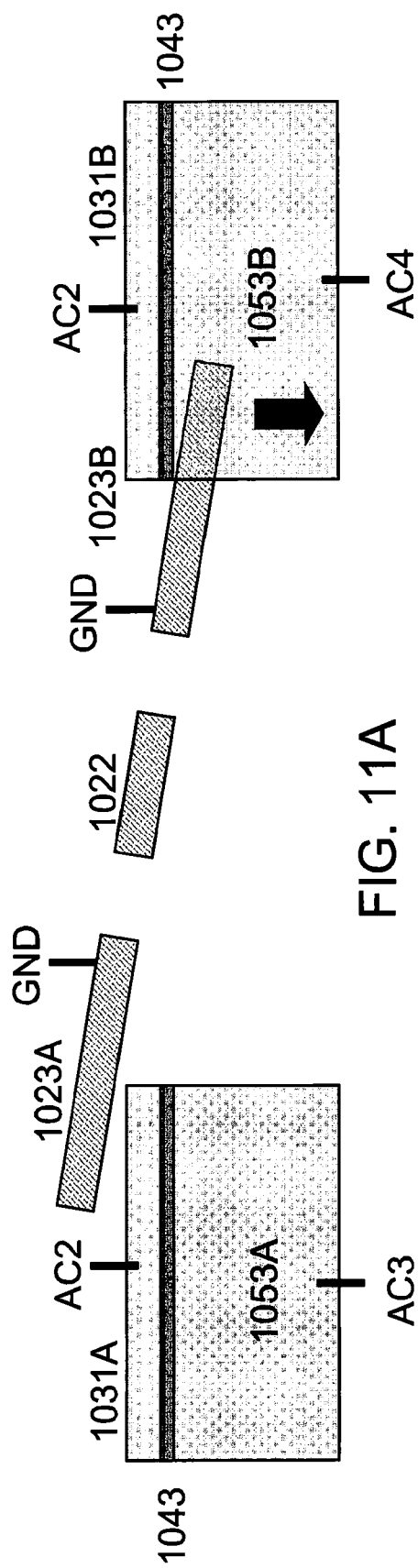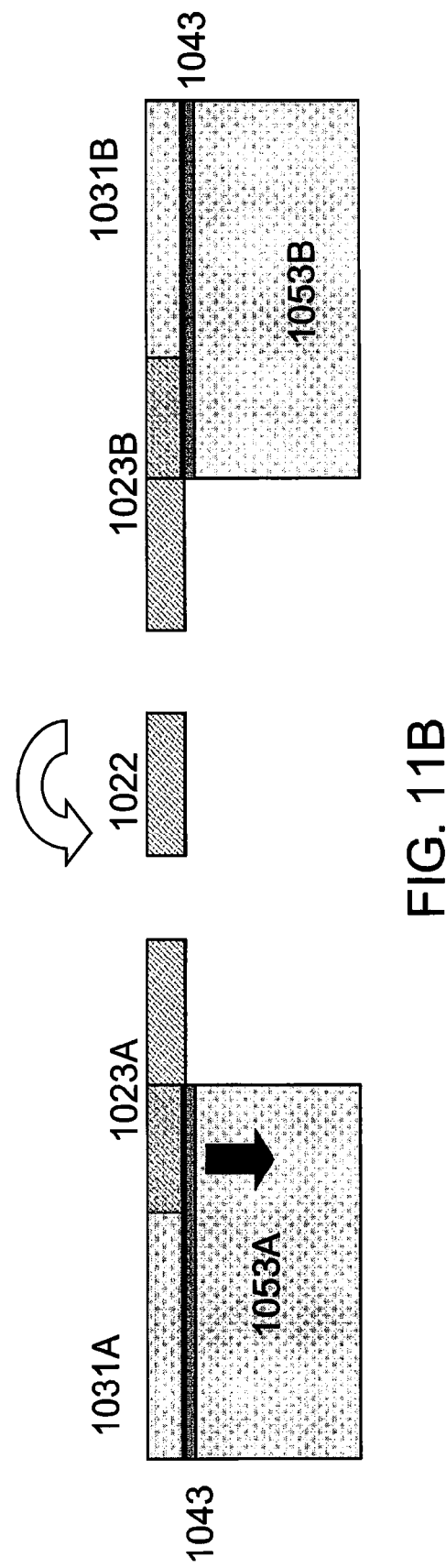
FIG. 11A
FIG. 11B

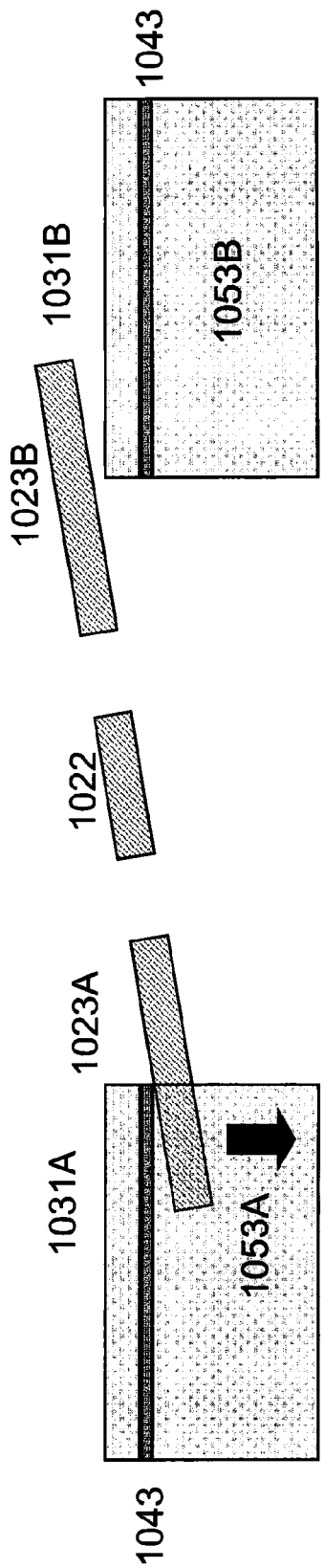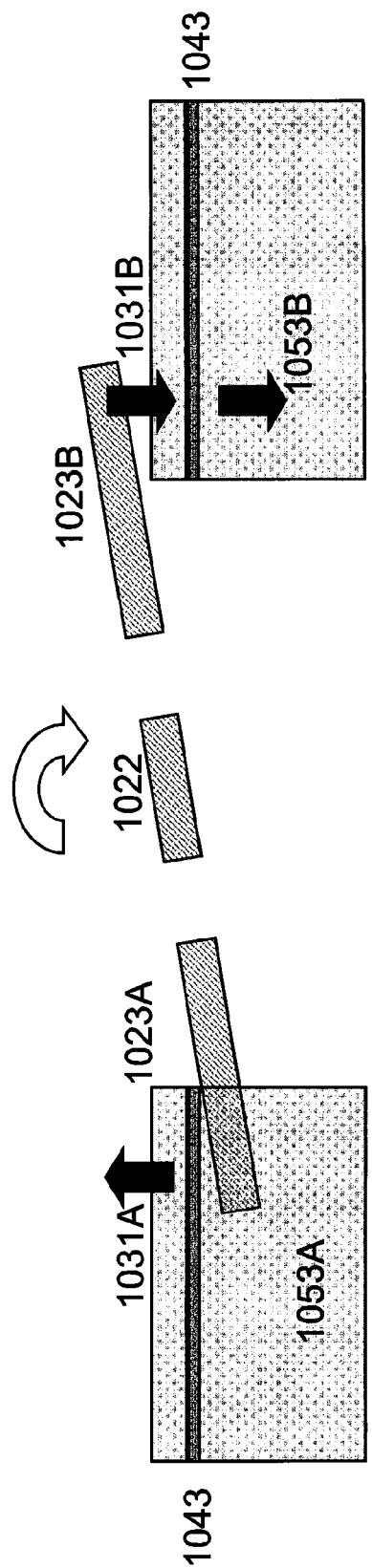
FIG. 11C
FIG. 11D

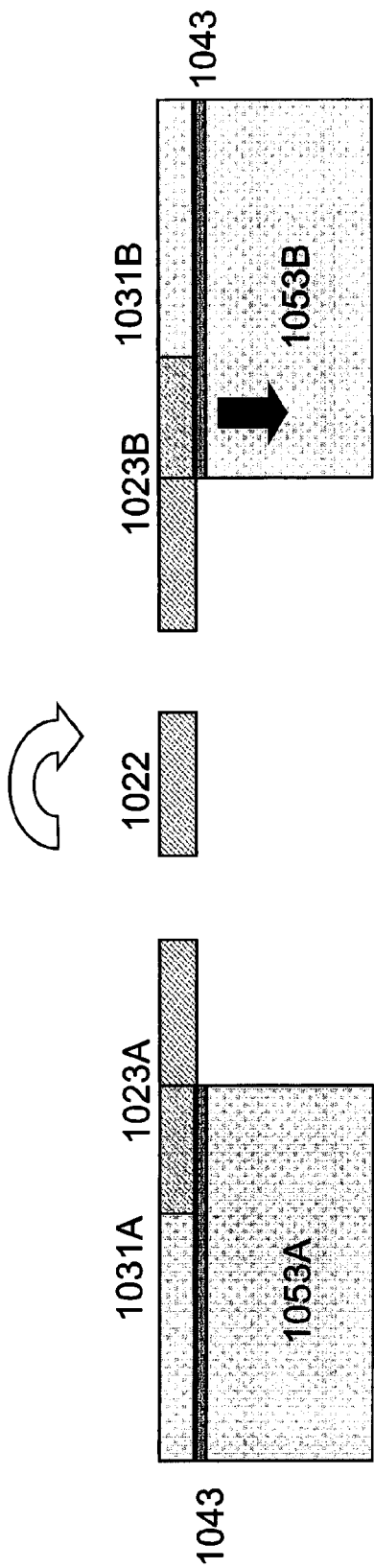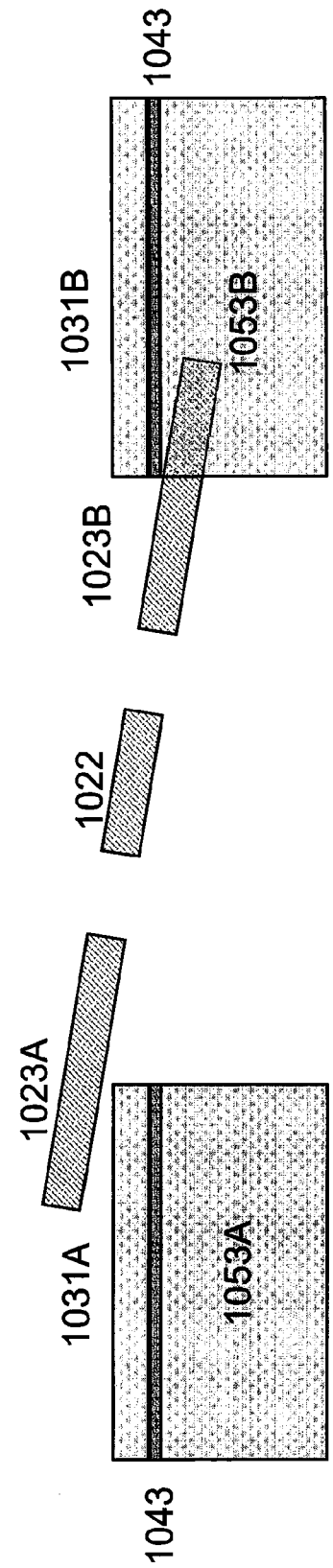
FIG. 11E
FIG. 11F

TWO-DIMENSIONAL MICROMECHANICAL ACTUATOR WITH MULTIPLE-PLANE COMB ELECTRODES

BACKGROUND OF THE INVENTION

The present invention relates to a micro-electro-mechanical actuator, and more particularly to two-dimensional actuator.

Micro-electro-mechanical mirrors have great potential in wide variety of optical applications including laser projection display, optical communication, confocal microscope, laser radar, and etc. For certain optical scanning applications such as scanning laser projection display, the mirror needs to achieve large optical scanning angle at specific frequency under predetermined driving conditions. Large optical scanning angle is also a key to optical resolution and smaller product footprint. For scanning mirror, the requirement poses a challenge in the design of actuator to generate large actuation force.

Conventional electrostatic driven two-dimensional micro-electro-mechanical actuators can be categorized into parallel plate electrodes and comb drive electrodes. In the case of parallel plate electrodes, voltage difference is generated between driving electrode typically positioned beneath the movable mirror which is also served as counter-electrode. Due to the fact that the electrostatic attraction force is inverse proportional to the distance between the mirror and the underneath driving electrode, mirror actuated by parallel plate electrodes does not have large scanning angle in practice. On the other hand, comb drive electrodes are designed to be in inter-digitated arrangement to avoid such limitation of parallel pate design, and are preferred for applications requiring large optical scanning angle.

In U.S. Pat. No. 7,271,946B2, Esashi and Kikuchi disclosed a two-dimensional micromirror structure. The comb-drive actuators are designed as vertical comb actuators in staggered three-layer architecture to allow bi-directional rotation of the mirror. The staggered vertical comb-drive actuators may require twice the space of in-plane comb actuator to allow bi-directional rotation of the mirror. Furthermore the vertical comb electrodes in staggered three-layer structure may demand higher precision in manufacturing process comparing to in-plane comb actuator.

In U.S. Pat. No. 6,819,822B2, Behrang Behin, et al described a two-dimensional micro-electro-mechanical scanner with gimbaled architecture driven by vertical interdigitated comb electrodes. The inner part of the gimbal structure can be controlled independently by activating two sets of vertical comb electrodes to allow rotation about two independent axes.

In U.S. Pat. Nos. 7,205,174 and 7,329,930, the inventor of the present invention disclosed the designs and fabrication methods of a micro-electro-mechanical comb-drive actuator with both in-plane and vertical comb electrodes. The multiple-plane comb-drive design enlarges the actuation force and increases the optical scanning angle of the movable element comparing to a vertical comb-drive actuator. The present invention extends the design of micromechanical actuator as described in U.S. Pat. No. 7,329,930 to two dimensional micromechanical actuator using multiple-plane comb electrodes to achieve further functionality.

SUMMARY OF THE INVENTION

It is the objective of the present invention to provide a two-dimensional micro-electro-mechanical actuator with in-plane comb electrodes.

It is the objective of the present invention to provide a two-dimensional micro-electro-mechanical actuator with both in-plane and vertical comb electrodes that enhance the motion control of the actuator.

It is a further objective of this invention to provide a two-dimensional micro-electro-mechanical actuator with both in-plane and dual-side vertical comb electrodes that further enhance motion control of the actuator.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 2A-2F illustrate the actuation of in-plane comb-drive actuator of the inner movable element of the top layer;

FIGS. 7A-7F illustrate the actuation of in-plane comb-drive actuator of the support element of the top layer of the embodiment as described in FIGS. 6A, 6B and 6C;

FIG. 9 illustrates a typical raster scanning motion of a two-dimensional micro-electro-mechanical actuator;

FIGS. 11A-11F illustrate the actuation of the support element by in-plane and vertical comb-drive actuators;

DETAILED DESCRIPTION OF THE PREFERRED EMBODIMENTS

Figure 1C:
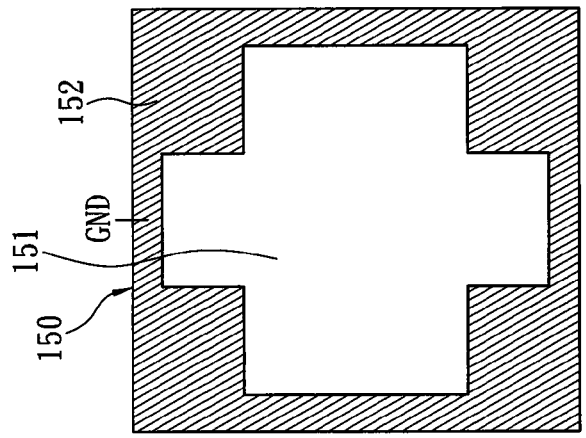
FIGS. 1A, 1B and 1C illustrate the exploded plane views of the top, middle and bottom layers of one embodiment of the present invention.
Figure 1B:
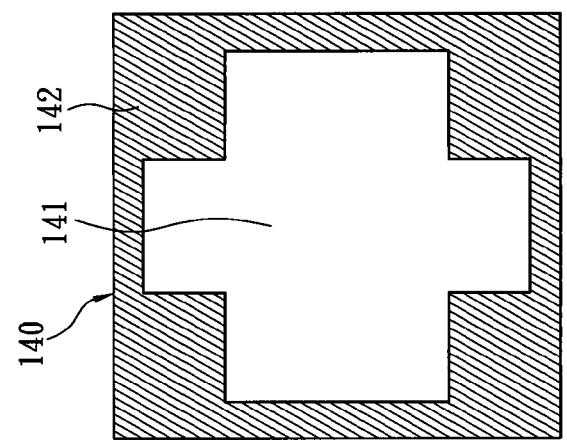
Figure 1A:
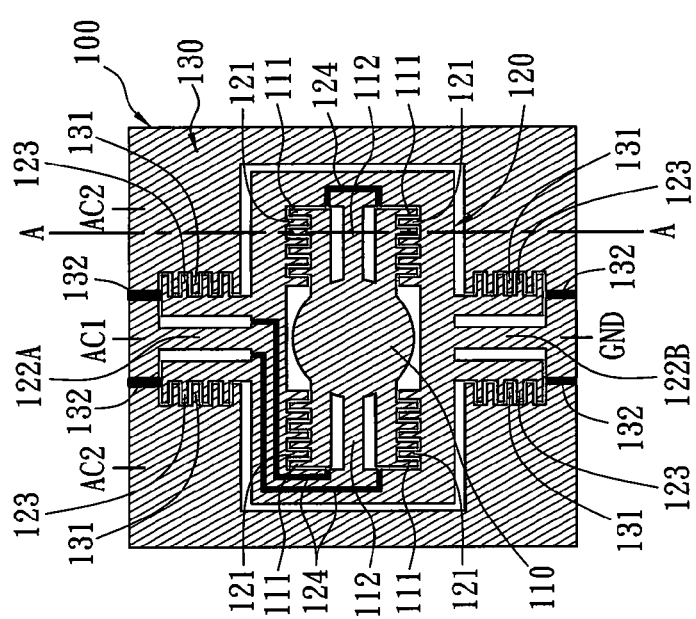

FIGS. 1A, 1B and 1C show the exploded plane views of the three layers of a MEMS actuator in accordance with one embodiment of the present invention. Top layer 100, FIG. 1A, is consisted of a gimbaled structure including a movable element 110, a support element 120 and a stationary element 130, and is made of electrically conductive material, typically doped single crystal silicon. Movable element 110 including comb electrodes 111 may be coated with reflective material and is connected to a support element 120 by a pair of torsional hinges 112. Movable element 110 is electrically insulated from support element 120 by insulation trenches 124, typically filled with electrical insulation material such as silicon dioxide or silicon dioxide and poly-silicon to provide mechanical strength. Support element 120 has inner comb electrodes 121 and outer comb electrodes 123, and is connected to the stationary element 130 by a pair of torsional hinges 122A and 122B. Support element 120 is electrically insulated from stationary element 130 by insulation trenches 132. Inner comb electrodes 121 are interdigitated with comb electrodes 111 in the horizontal plane defined by top layer 110 to form an in-plane comb-drive actuator. Comb electrodes 123 are also interdigitated with comb electrodes 131 in the horizontal plane defined by top layer 110 to form another in-plane comb-drive actuator.

Middle layer 140, shown in FIG. 1B, is made of electrically non-conductive material, typically silicon dioxide in order to provide insulation between top layer 100 and bottom layer 150. Middle layer 140 is consisted of an opening 141, and a stationary element 142.

Bottom layer 150, shown in FIG. 1C, consisting of an opening 151 and a stationary element 152, is typically made of electrically conductive material such as single crystal silicon. Opening 151 is either a through hole or a cavity designed with specific depth to provide a space for the rotation of movable element 110 and support element 120 of the top layer 100 in addition to mechanically support middle layer 140 and top layer 100.

As described in FIG. 1A, comb electrodes 111 of movable element 110 may be connected to a first alternating voltage source AC1 through torsional hinge 112 and 122A. Comb electrodes 131 of stationary element 130 are connected to a second alternating voltage source AC2, and comb electrodes 121 and 123 of support element 120 are connected to electrical ground GND through torsional hinge 122B. Stationary element 152 of bottom layer 150 may be also connected to electrical ground GND to minimize electrical cross talk.

Figure 2A:
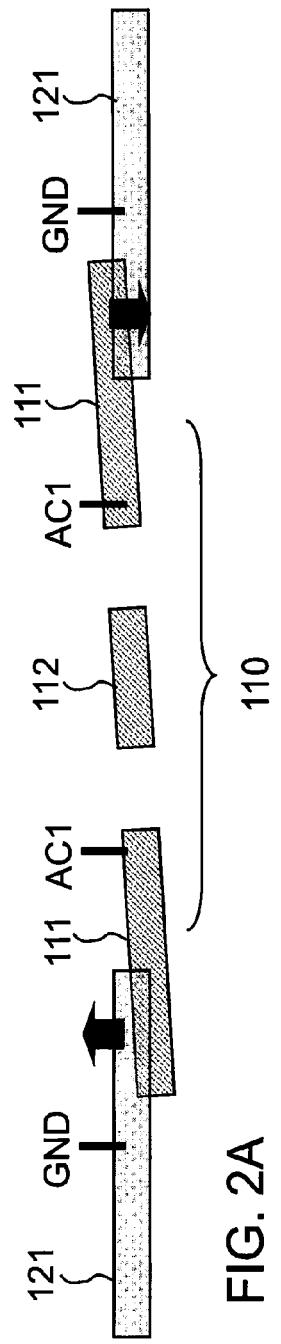
Figure 2B:
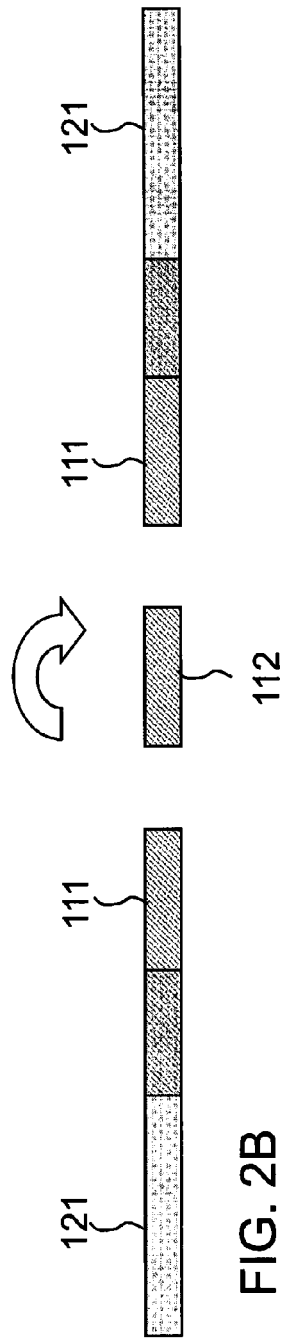
Figure 2C:
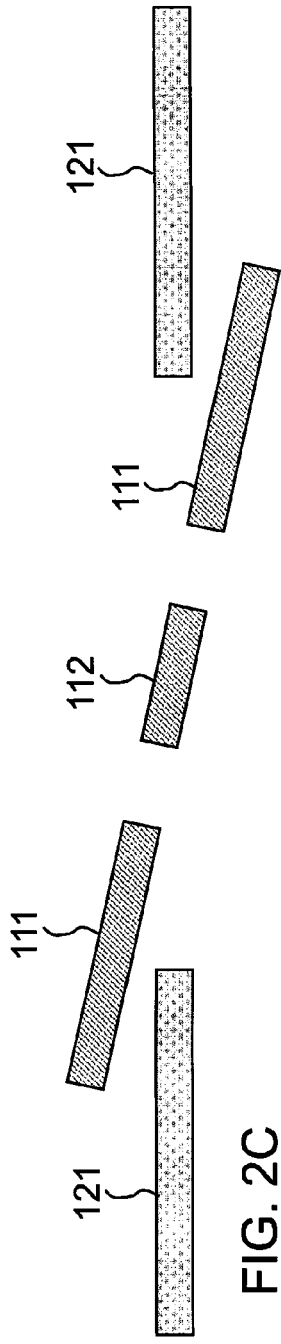

In this embodiment, the operation of both inner comb-drive actuator consisting of comb electrodes 111 and 121, and outer comb-drive actuator consisting of comb electrodes 123 and 131 share similar actuation method. FIGS. 2A-2F illustrate the operation of inner comb-drive actuator consisting of comb electrodes 111 and 121 as an example. FIG. 2A is a cross-section view of top layer 100 along line A-A. For purpose of illustration, comb electrodes 111 of movable element 110 and comb electrodes 121 of support element 120 are drawn in translucence. Comb electrodes 111 is connected to a first voltage source AC1 while comb electrodes 121 is connected to electrical ground GND to form an in-plane comb actuator. The movable element 110 starts oscillation about an axis defined by a pair of torsional hinges 112 through unbalanced electrostatic force in the in-plane comb actuator. The unbalance force in the in-plane comb actuator may be introduced from manufacturing tolerances or intentional design features. When the movable element 110 returns to the horizontal position or when comb electrodes 111 align with comb electrodes 121 in the same horizontal plane as shown in FIG. 2B, voltage source AC1 is switched to the same voltage level as electrical ground GND to allow movable element 110, undergoing rotation caused by restoring torque in torsional hinges 112, to reach maximum rotation angle in clockwise direction as shown in FIG. 2C. After movable element 110 reaches the maximum rotation angle, AC1 is switched to higher voltage level such that movable element 110 is restored to the horizontal position by the electrostatic attraction force between comb electrodes 111 and comb electrodes 121, FIGS. 2D and 2E. When movable element 110 is restored to the horizontal position, AC1 is switched to electrical ground level again such that movable element 110 rotates without actuation force to maximum rotation angle in counter-clockwise direction, FIG. 2F. After movable element 110 reaches another maximum rotation angle, actuation force from comb electrodes 111 and comb electrodes 121 will again be applied to movable element 110 until horizontal position is restored to complete one oscillation cycle.

Figure 3:
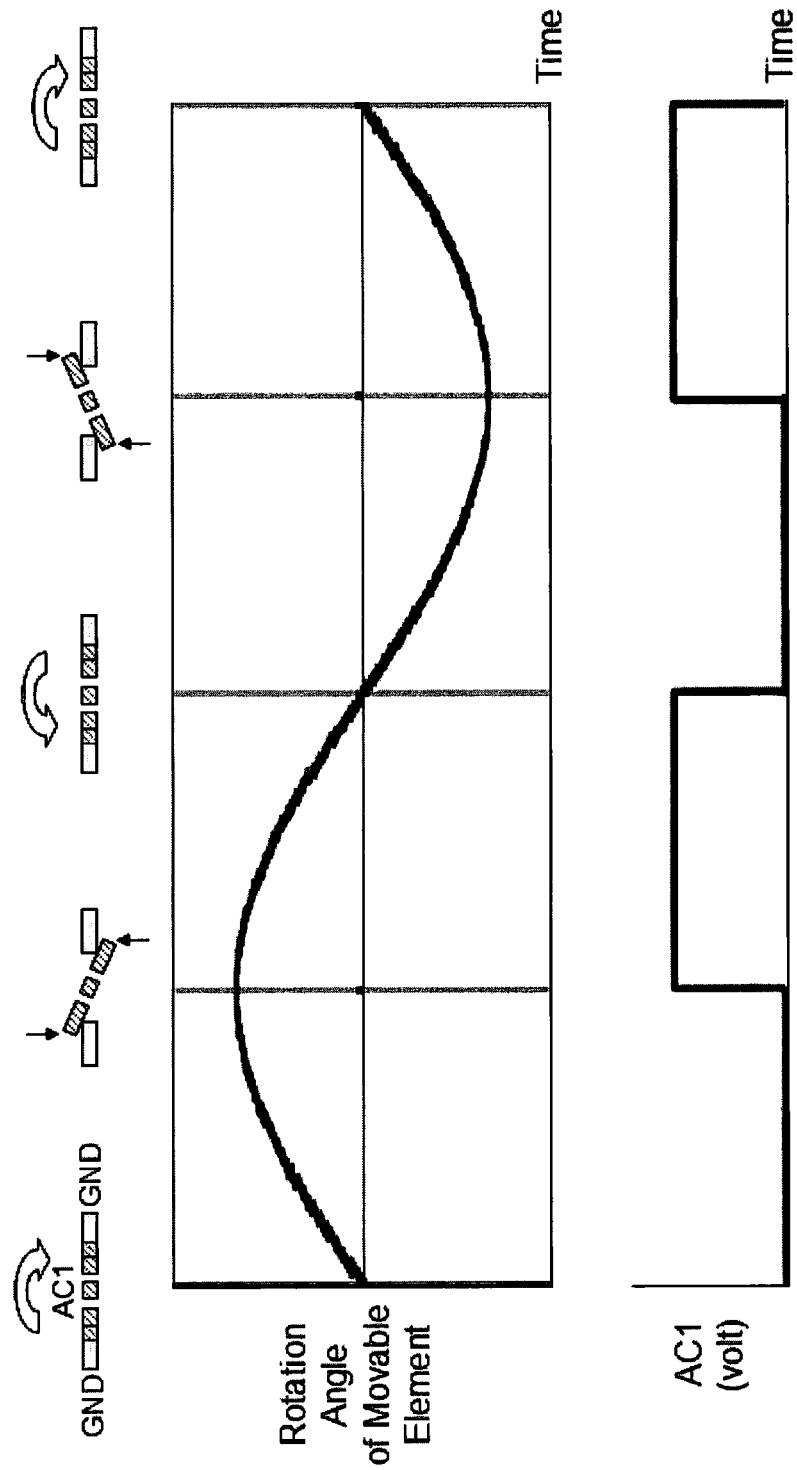
FIG. 3 illustrates the relationship between the oscillation amplitude of the inner movable element of the top layer about the first pivoting axis and the phase of applied voltage AC1.

FIG. 3 illustrates the relationship between the oscillation amplitude of movable element 110 with comb electrodes 111, and phase and amplitude of applied alternating voltage source AC1 corresponding. Movable element 110 is typically designed to oscillate at or near its resonance frequency of the primary oscillation mode. The frequency of AC1 is typically twice the oscillation frequency of movable element 110. Comb electrodes 121 of support element 120 are connected to electrical ground GND and are interdigitated with comb electrodes 111 in the same horizontal plane defined by top layer 100. The waveform of AC1 can be various shapes such as square, sinusoidal, half-sinusoidal or sawtooth shapes to achieve desired angular velocity of the movable element 110. Typically, waveform of square shape provides the highest efficiency in driving movable element 110 to the largest rotation amplitude under given maximum amplitude of AC1.

Figure 4:
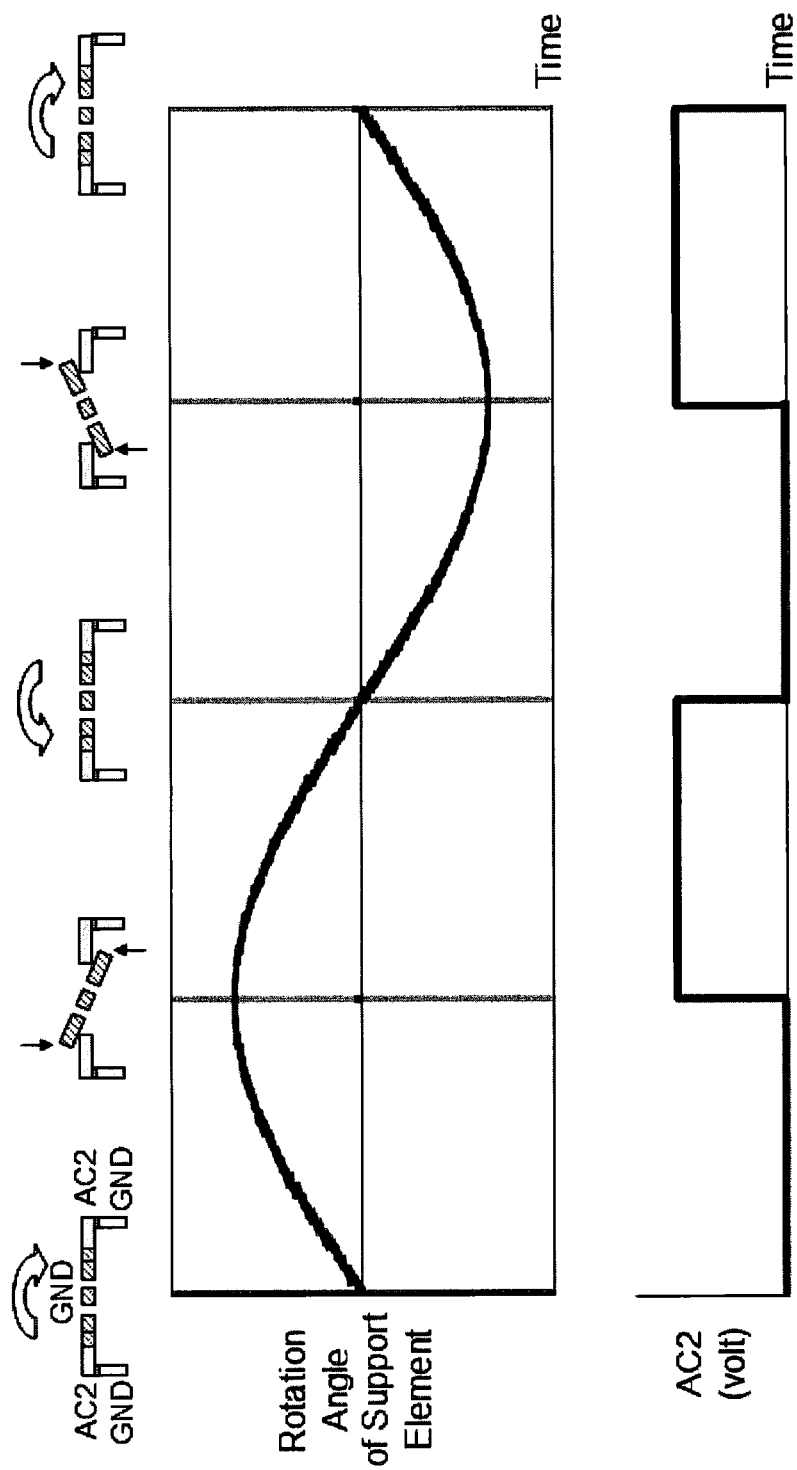
FIG. 4 illustrates the relationship between the oscillation amplitude of the support element of the top layer about the second pivoting axis and the phase of applied voltage AC2.

FIG. 4 illustrates the relationship between the rotation angle of support element 120 and a second alternating voltage source AC2. Movable element 110 mechanically connected to support element 120 will follow the rotation of support element 120 about an axis defined by torsional hinges 122A and 122B with respect to stationary element 130 as shown in FIG. 1. Comb electrodes 123 of support element 120, connecting to electrical ground GND, are interdigitated with comb electrodes 131 of stationary element 130, connecting to AC2, in the horizontal plane defined by top layer 100. Support element 120 is typically designed to oscillate at or near its resonance frequency of the primary oscillation mode. The frequency of AC2 is typically twice the oscillation frequency of support element 120 and are electrically insulated from AC1 and GND signals through insulation trenches 132. The waveform of AC2 can be various shapes to achieve desired angular velocity of the support element 120.

Figure 5:
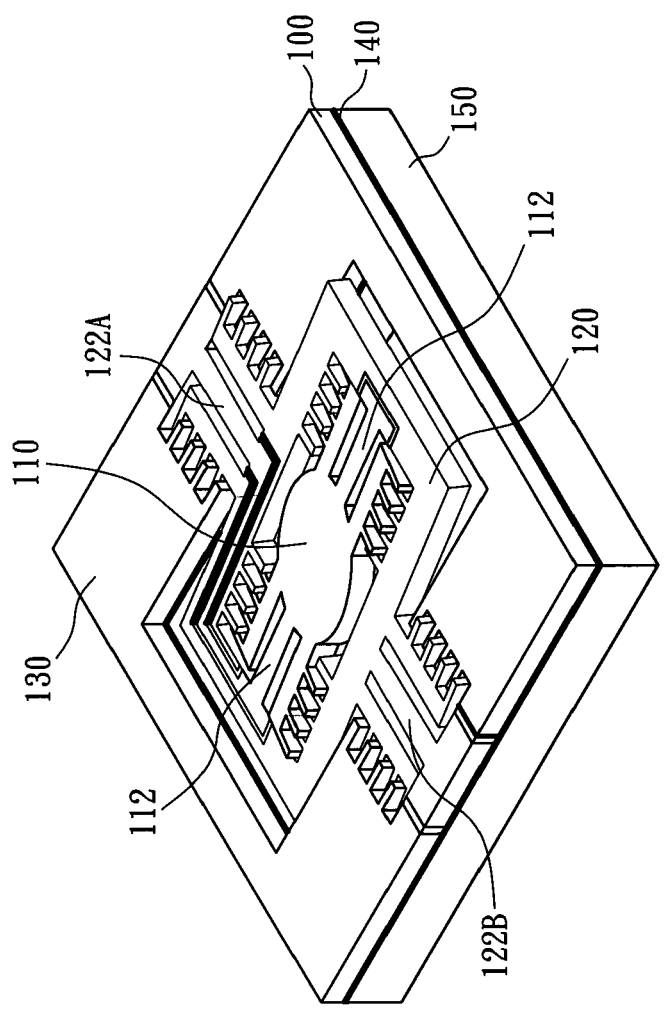
FIG. 5 illustrates the three dimensional view of one embodiment of the present invention showing a two-dimensional actuation of one embodiment the present invention.

FIG. 5 shows that the present embodiment allows movable element 110 to be actuated in two-dimensional oscillation with only in-plane comb actuators with rotation axes defined by torsional hinges 112, and torsional hinges 122A and 122B are arranged in orthogonal direction. The embodiment also allows movable element 110 in substantially larger oscillation amplitude with only in-plane comb-drive electrodes if the rotation axes defined by torsional hinges 112, and torsional hinges 122A and 122B are aligned along the same axis with the same driving frequency of AC1 and AC2.

Figures 6A, 6B, 6C:
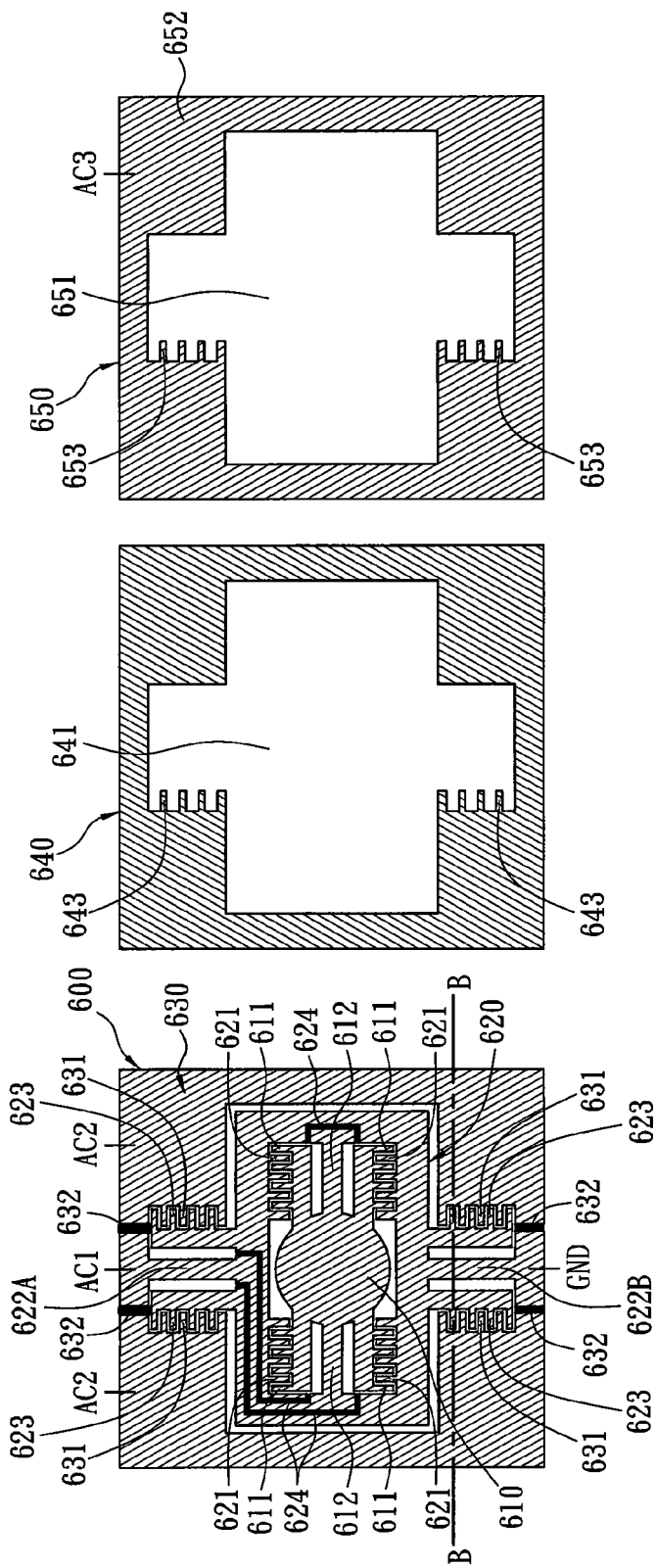
FIGS. 6A, 6B and 6C illustrate the exploded plane views of the top, middle and bottom layers of a second embodiment of the present invention.

FIGS. 6A, 6B and 6C show the exploded plane views of the three layers of a MEMS actuator in accordance with a second embodiment of the present invention. Top layer 600, is consisted of a gimbaled structure including a movable element 610, a support element 620 and a stationary element 630, and is made of electrically conductive material, typically doped single crystal silicon. Movable element 610 including comb electrodes 611 may be coated with reflective material and is connected to support element 620 by a pair of torsional hinges 612. Furthermore, movable element 610 is electrically insulated from support element 620 by insulation trenches 624, typically filled with electrical insulation material such as silicon dioxide or silicon dioxide and polysilicon to provide mechanical strength. Support element 620 has inner comb electrodes 621 and outer comb electrodes 623, and is connected to stationary element 630 by a pair of torsional hinges 622A and 622B. Support element 620 is electrically insulated from stationary element 630 by insulation trenches 632 which may be filled trenches or open trenches. Inner comb electrodes 621 are interdigitated with comb electrodes 611 to form an in-plane comb-drive actuator. Comb electrodes 623 are interdigitated with comb electrodes 631 to form another in-plane comb-drive actuator.

Middle layer 640, shown in FIG. 6B, is made of electrically non-conductive material, typically silicon dioxide in order to provide insulation between the top layer 600 and the bottom layer 650. Middle layer 640 is consisted of an opening 641, and comb-shaped structure 643. Comb-shaped structure 643 is used to electrically insulate comb electrodes 653 of bottom layer 650 from comb electrodes 631 of top layer 600.

Bottom layer 650, consisting of an opening 651, either a through hole or a cavity, comb electrodes 653, and an electrode pad 652, is made of electrically conductive material, typically doped single crystal silicon. In the case of cavity, opening 651 is designed with specific depth to provide enough space for the rotation of movable element 610 and support element 620 of top layer 600. The choice of either a through hole or a cavity may depend on the cost or the manufacturing efforts to form opening 651. Comb electrodes 653 is vertically interdigitated with comb electrodes 623 of top layer 600 to form a vertical comb-drive actuator such that support element 620 can be actuated by both in-plane and vertical comb-drive actuators.

In FIG. 6A, comb electrodes 611 of movable element 610 may be connected to a first alternating voltage source AC1 through torsional hinges 612 and 622A. Comb electrodes 631 may be connected to a second alternating voltage source AC2. Inner comb electrodes 621 and outer comb electrodes 623 of support element 620 are connected to electrical ground GND through torsional hinge 622B. Comb electrodes 653 of bottom layer 650 may be connected to a third alternating voltage source AC3 as shown in FIG. 6C.

In this embodiment, the actuation of movable element 610 through in-plane comb-drive actuator is similar to the actuation method of movable element 110 as described in the first embodiment. Movable element 610 may be oscillated at or near its resonance frequency while frequency of AC1 is twice the oscillation frequency of movable element 610.

Figure 7C:
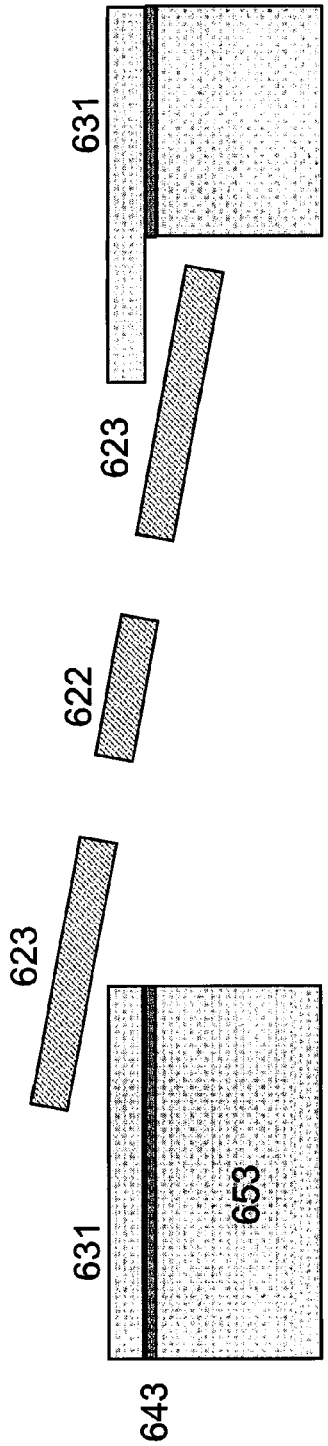
Figure 7D:
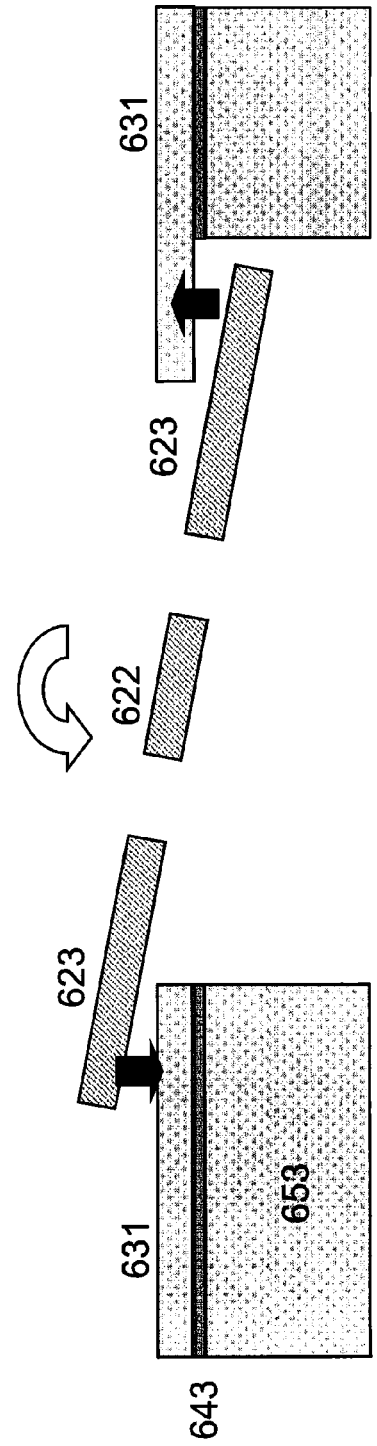

FIGS. 7A-7F illustrate actuation of support element 620 with a cross section view along line B-B of top layer 600. For purpose of illustration, comb electrodes 631 of top layer 600 and comb electrodes 653 of bottom layer 650 are drawn in translucence. In FIG. 7A, comb electrodes 623 of support element 620 and comb electrodes 631 of stationary element 630 form an in-plane comb actuator whereas stationary comb electrodes 653 of bottom layer 650 and comb electrodes 623 of support element 620 form a vertical comb actuator. In FIG. 7A, support element 620 with comb electrodes 623, connecting to electrical ground GND, is driven by electrodes 631, connecting to AC2, to rotate from its maximum rotation angle in clockwise direction about an axis defined by torsional hinges 622A and 622B with AC3 switched to electrical ground level. When support element 620 passes through its horizontal position as shown in FIG. 7B, voltage level of AC2 is switched to electrical ground to allow free rotation of support element 620 in clockwise direction until maximum rotation angle is reached as shown in FIG. 7C. After reaching the maximum rotation angle in clockwise direction, electrostatic attraction force from comb electrodes 623 and 631 is applied to support element 620 by increasing voltage level of AC2, as shown in FIG. 7D. The attraction force is continuously applied until support element 620 rotates counter-clockwise back to horizontal position as shown in FIG. 7E. Electrostatic attraction force from vertical comb actuator, comb electrodes 623 and 653, is applied to continue rotation of support element 620 until it reaches maximum rotation angle in counter-clockwise direction as shown in FIG. 7F to complete a cycle of motion.

Figure 8A:
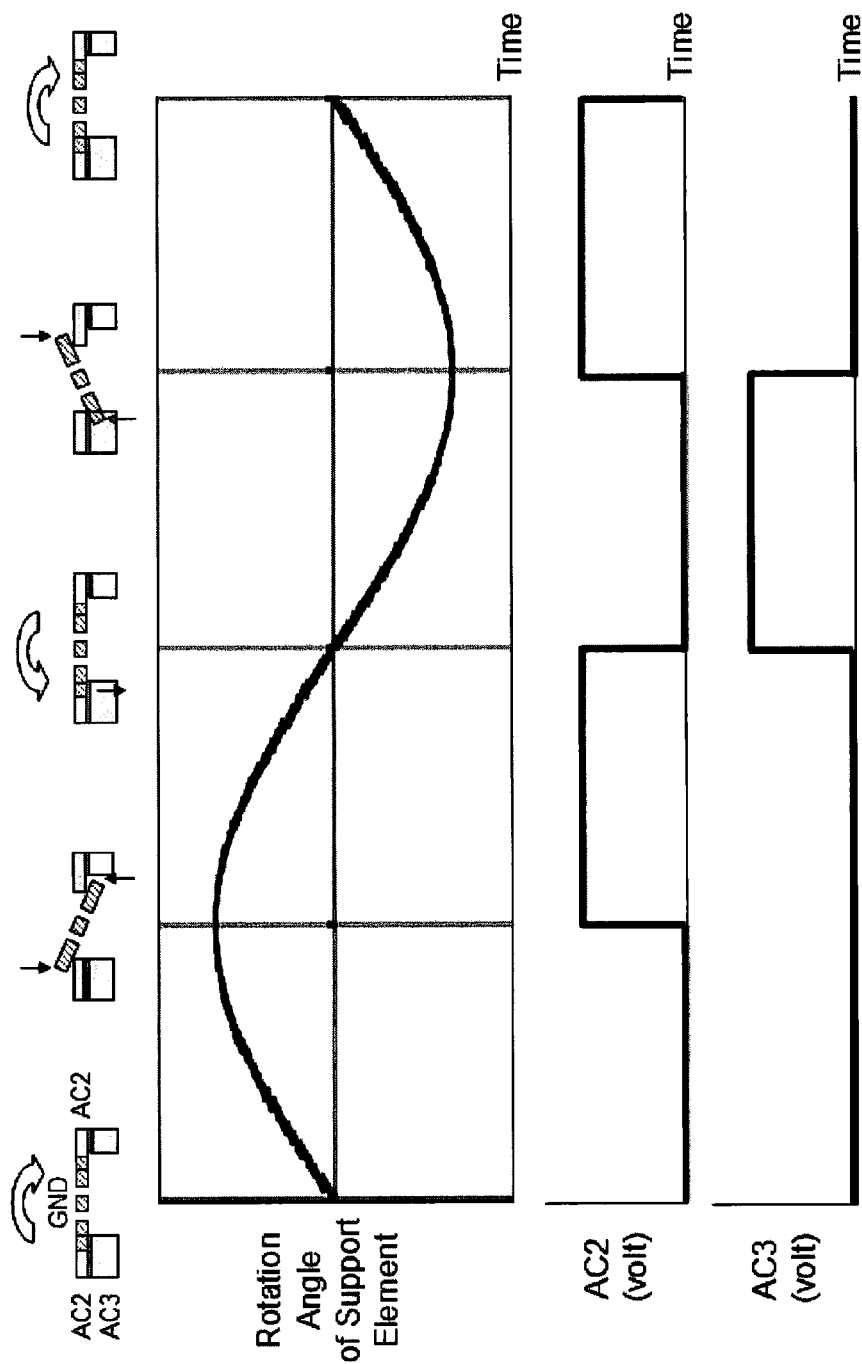
FIG. 8A illustrates the relationship between the oscillation amplitude of the support element of the top layer about the second pivoting axis, and the phase and amplitude of applied voltages AC2 and AC3.

FIG. 8A illustrates the relationship between the rotation angle of support element 620, and the phase and amplitude of applied voltage sources AC2 and AC3 corresponding to FIG. 7. Support element 620 may be designed to oscillate at or near its resonance frequency of primary oscillation mode. Movable element 610 mechanically connected to support element 620 will follow the rotation of support element 620 about an axis defined by torsional hinges 622A and 622B with respect to stationary element 630. The frequency of voltage sources AC2 and AC3 are typically twice of and the same as the oscillation frequency of support element 620, respectively. Voltage source AC3, applied to vertical comb actuator is used to increase rotation angle of support element 620. The waveforms of AC2 and AC3 can be various shapes to achieve desired angular velocity of the support element 620. Typically, waveform of square shape provides the highest efficiency in driving support element 620 to the largest rotation amplitude under given maximum amplitude of AC2 and AC3.

Figure 8B:
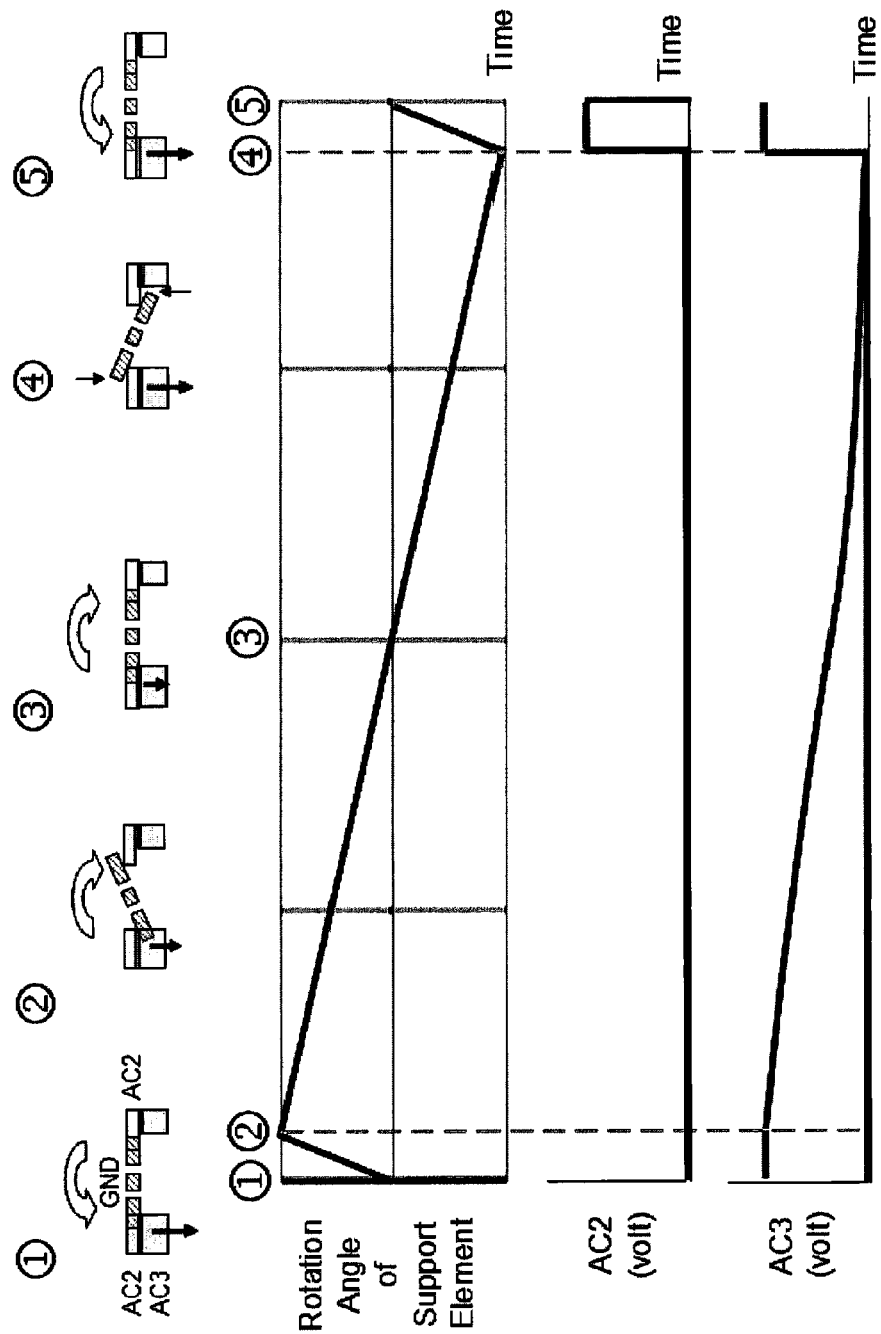
FIG. 8B illustrates the relationship between the oscillation amplitude of the support element of the top layer about the second pivoting axis, and the phase and amplitude of applied voltages AC2 and AC3.

FIG. 8B illustrates that support element 620 can be controlled in sawtooth rotation motion through controlling waveforms of voltage sources AC2 and AC3 such that the MEMS actuator can generate raster scan motion as shown in FIG. 9. Starting from horizontal position, support element 620 is actuated in counter-clockwise rotation to maximum angle by vertical comb actuators, comb electrodes 623 and 653, with voltage difference of AC3. After reaching maximum angle, support element 620 may be controlled in clockwise and linear rotation by controlling the force balance between the vertical comb actuator and the restoring torque in torsional hinges 622A and 622B. Support element 620 may continue to rotate linearly in clockwise direction until it reaches the other maximum rotation angle with gradually reduced voltage level of AC3. After reaching the other maximum rotation angle, support element 620 may return quickly in counter-clockwise direction to the maximum angle through attraction forces generated from both in-plane and vertical comb actuators to complete an oscillation cycle.

Combing symmetrical oscillation of movable element 610 and sawtooth oscillation of support element 620 in orthogonal directions, movable element 610 mounted in gimbaled architecture is controllable to perform raster scan motion as described in FIG. 9. Thus, the second embodiment of the present invention as described in FIGS. 6A, 6B and 6C is capable of performing either raster scan motion or bi-directionally symmetric scan motion through control of applied voltage sources AC1, AC2 and AC3.

Figures 10A, 10B, 10C:
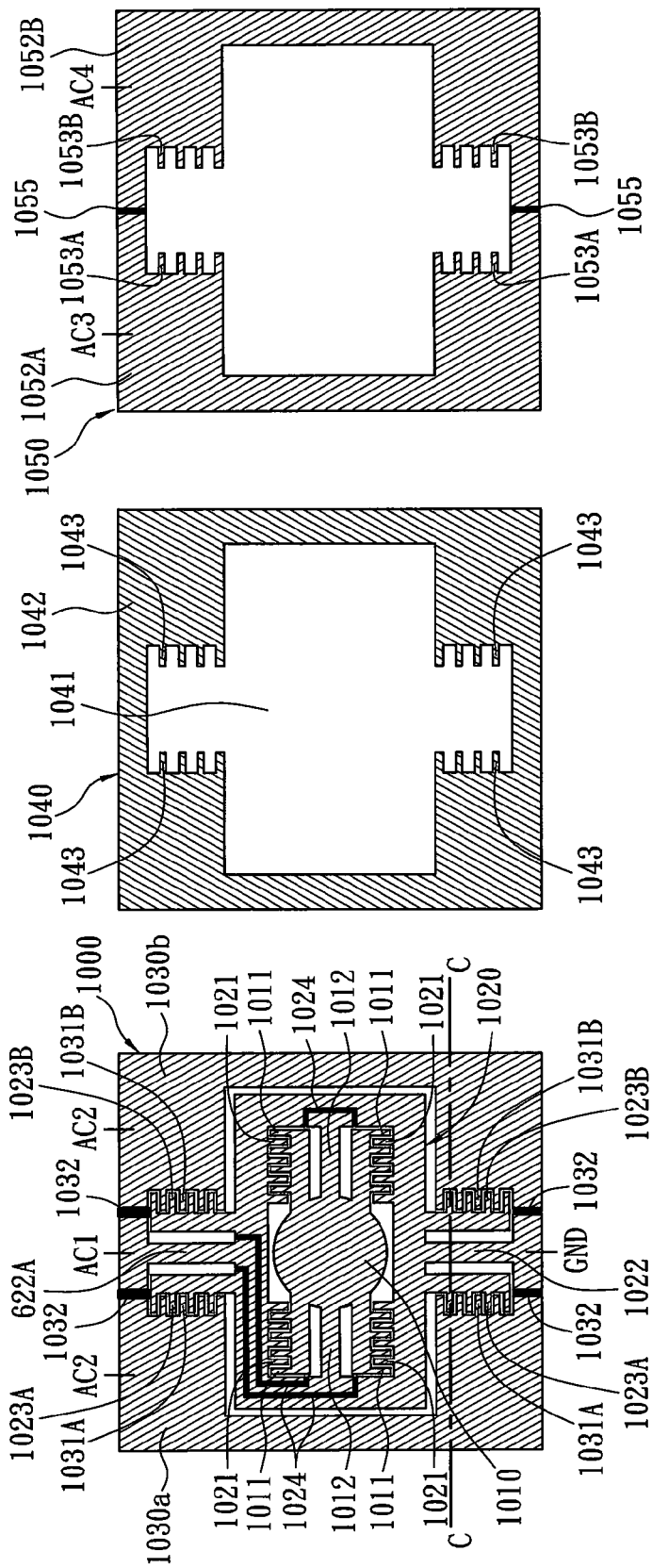
FIGS. 10A, 10B and 10C illustrate the exploded plane views of the top, middle and bottom layers of another embodiment of the present invention.

FIGS. 10A, 10B and 10C shows the exploded plane views of the three layers of a MEMS actuator in accordance with a third embodiment of the present invention. Top layer 1000 is consisted of a gimbaled structure including a movable element 1010, a support element 1020 and a stationary element 1030, and is made of electrically conductive material, typically doped single crystal silicon. Movable element 1010 including comb electrodes 1011 is connected to a support element 1020 by a pair of torsional hinges 1012, and is electrically insulated from support element 1020 by insulation trenches 1024, typically filled with electrical insulation material such as silicon dioxide or silicon dioxide and polysilicon to provide mechanical strength. Support element 1020 has inner comb electrodes 1021 and outer comb electrodes 1023, and is connected to the stationary element 1030 by a pair of torsional hinges 1022A and 1022B. Support element 1020 is electrically insulated from stationary element 1030 by insulation trenches 1032. Insulation trenches 1032 divide stationary element 1030 into at least two electrically insulated halves 1030A and 1030B, electrically connecting to comb electrodes 1031A and 1031B, respectively.

Inner comb electrodes 1021, connecting to electrical ground GND through torsional hinge 1022B, are interdigitated in the same plane with comb electrodes 1011, connecting to a first alternating voltage source AC1, to form an in-plane comb-drive actuator. Comb electrodes 1023A, connecting to electrical ground GND, are interdigitated with comb electrodes 1031A, connecting to a second alternating voltage source AC2, to form another in-plane comb-drive actuator. Comb electrodes 1023B, connecting to electrical ground GND, are interdigitated with comb electrodes 1031B, also connecting to AC2 to form another in-plane comb-drive actuator.

Middle layer 1040, shown in FIG. 10B, is made of electrically non-conductive material, typically silicon dioxide in order to provide insulation between top layer 1000 and bottom layer 1050. Middle layer 1040 is consisted of an opening 1041, a comb-shape structure 1043 and a stationary element 1042. Comb-shaped structure 1043 is used to electrically insulate comb electrodes 1053A and 1053B of bottom layer 1050 from comb electrodes 1031A and 1031B of top layer 1000.

Bottom layer 1050 consisting of an opening 1051, either a through hole or a cavity, comb electrodes 1053A, 1053B, and electrical insulation trenches 1055, is made of electrically conductive material, typically doped single crystal silicon. In the case of cavity, opening 1051 is designed with specific depth to provide enough space for the rotation of movable element 1010 and support element 1020 of top layer 1000. The choice of either a through hole or a cavity may depend on the cost or the manufacturing efforts to form opening 1051. Trenches 1055 are typically filled with electrical insulation material such as silicon dioxide or silicon dioxide and polysilicon to ensure structure integrity of bottom layer 1050 and to insulate comb electrodes 1053A and 1053B. Comb electrodes 1053A and 1053B may be connected to alternating voltage sources AC3 and AC4 through electrical pads 1052A and 1052B, respectively. Comb electrodes 1023A of support element 1020 and comb electrodes 1053A of bottom layer 1050 are vertically interdigitated to form a vertical comb-drive actuator. Comb electrodes 1023B of support element 1020 and comb electrodes 1053B of bottom layer 1050 are vertically interdigitated to form another vertical comb-drive actuator.

In this embodiment of the present invention, the actuation of movable element 1010 is similar to the actuation of movable element 110 by connecting comb electrodes 1011 to AC1 and connecting comb electrodes 1021 to electrical ground GND to form an in-plane comb-drive actuator. The in-plane comb-drive may be used to cause oscillation of movable element 1010 at or near its resonance frequency. The frequency of AC1 is typically twice the oscillation frequency of movable element 1010.

FIGS. 11A–11F illustrate actuation of support element 1020 with a cross section view of top layer 1000 along line C-C as shown in FIG. 10A. For purpose of illustration, comb electrodes 1031A and 1031B of top layer, and comb electrodes 1053A and 1053B of bottom layer are drawn in translucence. In FIG. 11A, support element 1020 rotates clockwise to a maximum angle about an axis defined by torsional hinge 1022A and 1022B which also generate a counter-clockwise restoring torque. In order to control linear rotation of support element 1020 according to the vertical motion of raster scan pattern as shown in FIG. 9, AC4 is applied to comb electrodes 1053B to adjust force balance of the restoring torque of torsional hinge 1022A and 1022B such that support element 1020 rotates linearly until it returns to horizontal position as in FIG. 11B. To rotate support element 1020 counter-clockwise from horizontal position, AC3 applied on comb electrodes 1053A is controlled to attract comb electrodes 1023A downward in linear rotation motion until support element 1020 rotates to the other maximum angle as shown in FIG. 11C. In order to perform vertical fly back motion as described in the raster scan pattern in FIG. 9, AC2 is controlled to generate attraction force in the in-plane comb actuator to quickly rotate support element 1020 clockwise to horizontal position as shown from FIG. 11D to FIG. 11E. When support element 1020 rotates clockwise through horizontal position, AC2 is switched to electrical ground level and AC4 is controlled to generate attraction force in the vertical comb actuator to linearly rotate support element 1020 clockwise to a maximum angle to complete an oscillation cycle.

Figure 12:
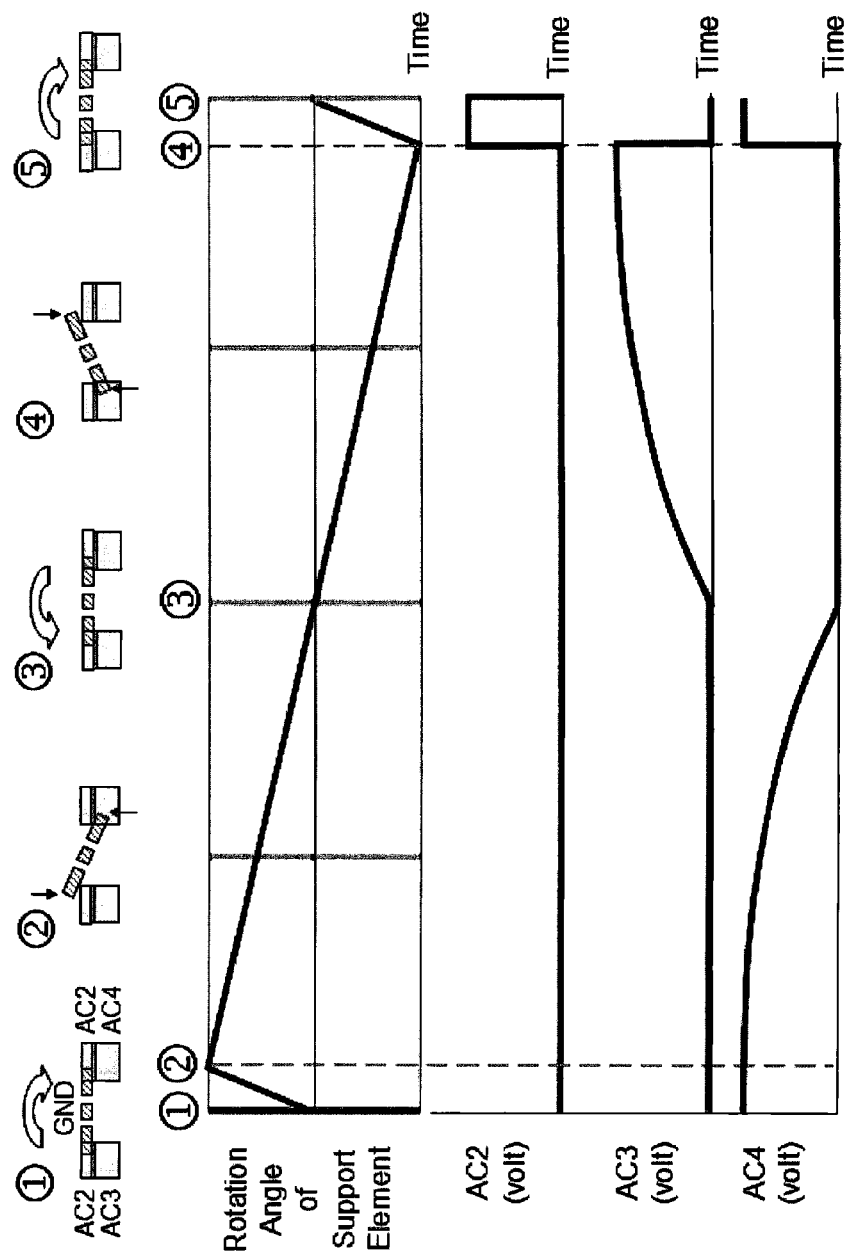
FIG. 12 illustrates the relationship between the oscillation amplitude of the support element, and the phase and amplitude of applied voltages AC2, AC3 and AC4.

FIG. 12 illustrates the relationship between the rotation angle of support element 1020 and the phase and amplitude of applied voltage sources AC2, AC3 and AC4 corresponding to FIG. 11. Motion of support element 1020 can be controlled in sawtooth rotation motion with controls of applied voltage sources. The oscillation motion of movable element 1010 at or near the resonance frequency can be controlled by applying voltage AC1 at twice the oscillation frequency of movable element 1010. Combining the oscillation motion of movable element 1010 with the sawtooth motion of support element 1020, the MEMS actuator can perform raster scan motion as shown in FIG. 9.

The embodiments described herein can be manufactured by methods according to U.S. Pat. No. 7,205,174 as disclosed by the inventor. The present invention extends the design of micromechanical actuator as described in U.S. Pat. No. 7,329,930 to two dimensional micromechanical actuator using multiple-plane comb electrodes to achieve further functionality.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A micro-electro-mechanical comb-drive actuator comprising:
 a first semiconductor layer having:
  a movable element mounted by a first pair of torsional hinges to a support element, having a first and a second sets of comb electrodes located on opposite sides of a first axis defined by the first pair of torsional hinges;
  the support element mounted by a second pair of torsional hinges to a stationary element, having a third and a fourth sets of inner comb electrodes located on the opposite sides of the first axis, and a fifth and a sixth sets of outer comb electrodes located on the opposite sides of a second axis defined by the second pair of torsional hinges, the support element having a plurality of insulation trenches formed within the support element to electrically insulate the moveable element from the support element; and the stationary element having a seventh and an eighth sets of comb electrodes located on the opposites of the second axis;

wherein the first and second sets of comb electrodes interdigitate with the third and fourth sets of comb electrodes, respectively in a same plane defined by the first semiconductor layer; the fifth and sixth comb electrodes interdigitate with the seventh and eighth sets of comb electrodes, respectively in the same plane defined by the first semiconductor layer;

a second semiconductor layer having a cavity and being devoid of the moveable element; and an electrical insulation layer which supports and insulates the first and second semiconductor layers.

2. The micro-electro-mechanical comb-drive actuator of claim 1, wherein the first rotation axis and the second rotation axis are arranged orthogonally.

3. The micro-electro-mechanical comb-drive actuator of claim 1, wherein the first and second sets of comb electrodes are coupled to a first alternating voltage source, the third, fourth, fifth and sixth sets of comb electrodes are coupled to electrical ground, whereas the seventh and eighth sets of comb electrodes are coupled to a second alternating voltage source.

4. The micro-electro-mechanical comb-drive actuator of claim 3, wherein the frequency of the first alternating voltage source is twice the oscillation frequency of the movable element.

5. The micro-electro-mechanical comb-drive actuator of claim 3, wherein the frequency of the second alternating voltage source is twice the oscillation frequency of the support element.

6. The micro-electro-mechanical comb-drive actuator of claim 1, wherein the second semiconductor layer further having a ninth set of comb electrodes located on one side of the second rotation axis and interdigitate vertically with the fifth set of comb electrodes of the support element.

7. The micro-electro-mechanical comb-drive actuator of claim 6, wherein the ninth set of comb electrodes is coupled to a third alternating voltage source.

8. The micro-electro-mechanical comb-drive actuator of claim 7, wherein the frequency of the third alternating voltage source is the same as the oscillation frequency of the support element.

9. A micro-electro-mechanical comb-drive actuator comprising:

a first semiconductor layer having:

a movable element mounted by a first pair of torsional hinges to a support element, having a first and a second sets of comb electrodes located on opposite sides of the first axis defined by the first pair of torsional hinges;

the support element mounted by a second pair of torsional hinges to a stationary element, having a third and a fourth sets of inner comb electrodes located on the opposite sides of the first axis, and a fifth and a sixth sets of outer comb electrodes located on the opposite sides of a second axis defined by the second pair of torsional hinges, the support element having a plurality of insulation trenches formed within the support element to electrically insulate the moveable element from the support element; and the stationary element having a seventh and an eighth sets of comb electrodes located on the opposites of the second axis;

wherein the first and second sets of comb electrodes interdigitate with the third and fourth sets of comb electrodes, respectively in a same plane defined by the first semiconductor layer; the fifth and sixth comb electrodes interdigitate with the seventh and eighth sets of comb electrodes, respectively in the same plane defined by the first semiconductor layer;

a second semiconductor layer being devoid of the moveable element and having:

a cavity; and a ninth and a tenth sets of comb electrodes electrically isolated and located on the opposite sides of the second rotation axis;

wherein the ninth and tenth sets of comb electrodes interdigitate vertically with the fifth and sixth sets of comb electrodes of the support element; and an electrical insulation layer which supports and insulates the first semiconductor layer and the second semiconductor layer.

10. The micro-electro-mechanical comb-drive actuator of claim 9, wherein the first rotation axis and the second rotation axis are arranged orthogonally.

11. The micro-electro-mechanical comb-drive actuator of claim 9, wherein the first and second sets of comb electrodes are coupled to a first alternating voltage source, the third, fourth, fifth and sixth sets of comb electrodes are coupled to electrical ground, the seventh and eighth sets of comb electrodes are coupled to a second alternating voltage source, the ninth set of comb electrodes is coupled to a third alternating voltage source, and the tenth set of comb electrodes is coupled to a fourth alternating voltage source.

12. The micro-electro-mechanical comb-drive actuator of claim 9, wherein the frequency of the first alternating voltage source is twice the oscillation frequency of the movable element.

* * * * *